United States Patent
Tsutsui (10) Patent No.: US 6,219,317 B1
(45) Date of Patent: Apr. 17, 2001

(54) OPTICAL DISC RECORDING AND/OR REPRODUCING APPARATUS AND METHOD

(75) Inventor: Keiichi Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/173,746

(22) Filed: Oct. 16, 1998

(30) Foreign Application Priority Data

Oct. 16, 1997 (JP) .................................................. 9-283901

(51) Int. Cl.$^7$ ....................................................... G11B 7/00
(52) U.S. Cl. .................................... 369/44.32; 369/44.29; 369/54
(58) Field of Search ............................. 369/44.27, 44.28, 369/44.29, 44.32, 44.34, 44.35, 44.36, 47, 54

(56) References Cited

U.S. PATENT DOCUMENTS 4,722,079 * 1/1988 Matsumoto ......................... 369/44.36
5,286,965 * 2/1994 Okada .
5,825,729 * 10/1998 Ogasawara et al. .......... 369/44.29 X

FOREIGN PATENT DOCUMENTS

05144029 * 6/1993 (JP) .

* cited by examiner

Primary Examiner—Muhammad Edun
(74) Attorney, Agent, or Firm—Ronald P. Kananen; Rader, Fishman & Grauer (57) ABSTRACT

An optical disc recording and/or reproducing apparatus 1 is provided in which servo having high followup performance can be applied without impairing steady-state stability under suppression of servo errors. The optical disc recording and/or reproducing apparatus 1 includes a shock sensor 7 for detecting an impact applied from outside, and a servo unit 14 which performs servo on the basis of focussing error signals and tracking error signals and in which the servo operation is switched between a first state having a usual servo followup performance and a second state having a servo followup performance higher than said first state. The apparatus 1 also includes a controller 15 having the finction of discriminating the impact strength sensed by the shock sensor 7 and of switching the servo operation of the servo unit 14 to the second state when the impact strength exceeds a pre-set strength.

5 Claims, 6 Drawing Sheets

OPTICAL DISC RECORDING AND/OR REPRODUCING APPARATUS AND METHOD

BACKGROUND OF THE INVENTION

1. Field of the Invention

This invention relates to a method and apparatus for recording and/or reproducing information signals for an optical disc. More particularly, it relates to an optical disc recording and/or reproducing method and apparatus for recording or reproducing information signals for an optical disc as a servo control operation s performed.

2. Description of the Related Art

Up to now, a disc-shaped recording medium for recording information signals, such as optical disc, is in widespread use. The optical disc recording and/or reproducing apparatus is configured for illuminating laser light on an optical disc from an optical pickup to record or reproduce information signals on or from the signal recording surface of the recording medium.

Recently, there is an increasing demand for a high recording density optical disc having a large data storage capacity. This high density recording is possible by reducing the diameter of a light spot of a laser light beam illuminated from an optical pickup on the signal recording surface.

The light spot diameter is changed by e.g., the wavelength of the laser light beam and by the numerical aperture NA of an objective lens. It is noted that the diameter of the light spot focussed on the signal recording surface is proportionate to the wavelength of the laser light and inversely proportionate to the numerical aperture NA of the objective lens.

Thus, high density recording on an optical disc becomes possible by shortening the wavelength of the laser light or by increasing the numerical aperture NA of the objective lens.

On the other hand, the depth of focus of the light spot is proportionate to its wavelength and inversely proportionate to the square of the numerical aperture NA of the objective lens. Since the depth of focus is reduced in case of using means for enabling high recording density, it is necessary to reduce the focussing error for assuring recording/reproduction.

Moreover, since the track pitch is narrowed by increasing the recording density, it is also necessary to reduce the tracking error for assuring recording/reproduction.

Thus, for realization of high recording density, suitable measures need to be used to reduce the follow-up errors of focussing servo and tracking servo that are mainly responsible for occurrences of focussing and tracking errors.

It is noted that, if a shock is applied from outside to a device, there are produced transient errors which need to be suppressed. Although it is possible to increase the servo followup performance by broadening the servo band and increasing the gain, steady-state servo stability is impaired by increasing the gain thus producing negative effects.

Specifically, should the servo band and the gain be increased to improve servo followup characteristics, there is raised a problem that the servo followup error is increased against expectations, such as by excess reaction to noise components of a higher frequency band.

SUMMARY OF THE INVENTION

It is therefore an object of the present invention to provide a method and apparatus for recording and/or reproducing an optical disc in which servo with high followup performance can be applied as servo errors are suppressed without obstructing steady-state stability.

The present invention provides an optical disc recording and/or reproducing apparatus for performing a servo control operation based on focussing error signals and tracking error signals from an optical pickup including impact detection means for detecting an impact applied from outside, and servo means for performing a servo control operation based on the focussing error signals and tracking error signals. The servo control operation is such an operation that is switched between a first state having a usual servo followup performance and a second state higher in a servo followup performance higher than the first state. The optical disc recording and/or reproducing apparatus also includes control means for checking the strength of an impact detected by the impact detection means for switching the servo control operation of the servo means to the second state when the strength of the impact exceeds a pre-set value.

Thus, with the present optical disc recording and/or reproducing apparatus, the control means sets servo means to the second state having a higher servo followup performance if the impact strength sensed by the impact detection means exceeds a pre-set strength.

Also, with the present optical disc recording and/or reproducing method, the impact strength applied from outside is discriminated and, if the impact strength exceeds a pre-set strength, the servo means is switched from the first state of the usual servo followup performance to the second state of the servo followup performance higher than that of the first state.

With the optical disc recording and/or reproducing apparatus of the present invention, the servo means can be set to the second state of higher servo followup performance, under control by the control means, to perform the servo operation, if the impact strength sensed by the impact detection means exceeds a pre-set strength.

That is, with the present optical disc recording and/or reproducing apparatus, the servo of high followup performance can be applied, without impairing steady-state stability, under suppressing occurrence of servo errors.

With the optical disc recording and/or reproducing method of the present invention, the impact strength applied from outside is discriminated and, if the impact strength exceeds a pre-set strength, the servo operation is performed as the first state of the usual servo followup performance is switched to the second state of the higher servo followup performance. That is, the servo of high followup performance can be applied, without impairing steady-state stability, under suppressing occurrence of servo errors.

DESCRIPTION OF THE PREFERRED EMBODIMENTS

Referring to the drawings, preferred embodiments of the present invention will be explained in detail. The configuration of the present embodiment is an optical disc recording and/or reproducing apparatus in which servo control is performed on the basis of focussing error signals and tracking error signals as supplied from an optical pickup.

Figure 1:
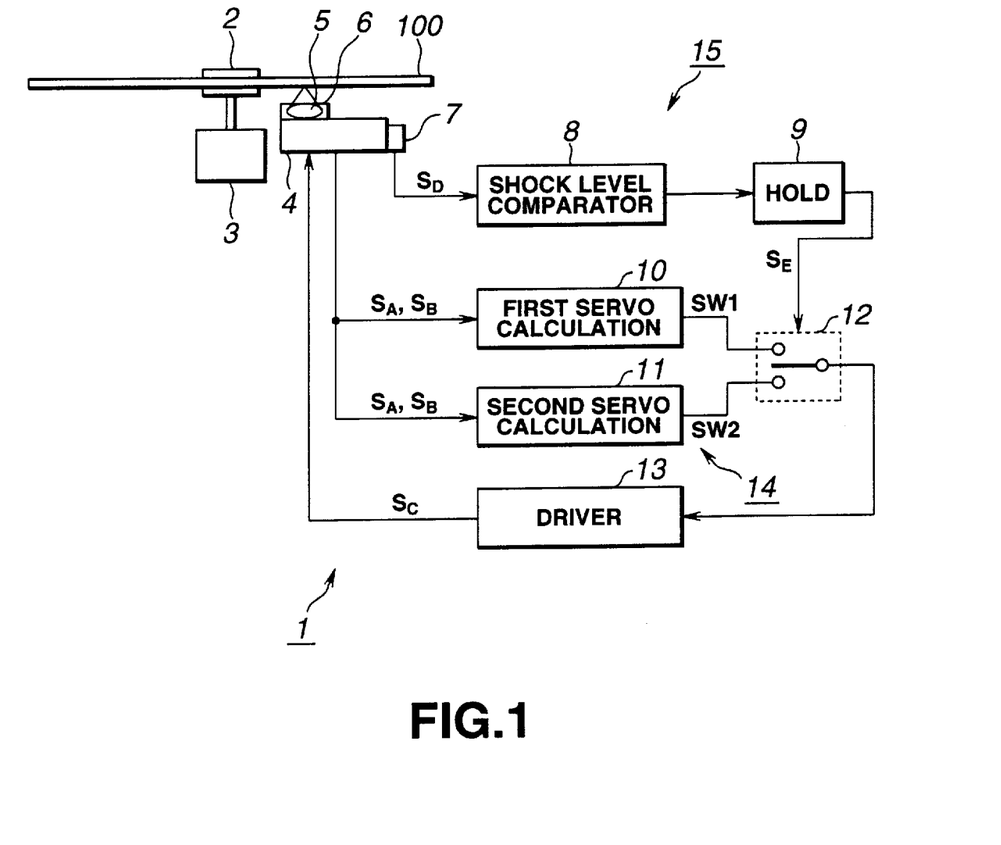
FIG. 1 is a block diagram showing the structure of an optical disc recording/reproducing apparatus embodying the present invention and especially showing the state in which an optical disc is loaded in position.

Referring to FIG. 1, the optical disc recording/reproducing apparatus includes a shock sensor 7, as impact sensor means for detecting impact applied from outside, and a servo unit 14 for performing servo based on the focussing error signals and tracking error signals. The servo unit 14 is switched between a first state of the servo operation having normal servo followup performance and a second state of the servo operation having the servo followup performance higher than that in the first state. The optical disc recording/reproducing apparatus also includes a controller 15 for discriminating the strength of the shock detected by the shock sensor 7 for switching the servo operation of the servo unit 14 to the second state if the strength of the shock is found to have exceeded a pre-set magnitude.

The servo unit 14 has first and second servo calculation units 10, 11, with different servo filters and gains, in association with the first and second states of the servo operation, and is responsive to a switching control signal from the controller 15 to switch between the first and second servo calculation units 10, 11.

The controller 15 includes a shock level comparator 8, as a shock strength discrimination unit for discriminating the shock strength as detected by the shock sensor 7, a holding circuit 9 for holding the results of discrimination obtained by the shock level comparator 8 for a predetermined time interval, and a switch 12, as switching means responsive to an output of the holding circuit 9 for switching between the first and second servo calculation units 10, 11.

When the shock strength detected by the shock sensor 7 exceeds a predetermined strength, the optical disc recording/reproducing apparatus 1 performs servo control operations, by servo signals from the second servo calculating unit 11 having the higher servo followup characteristics, under control by the controller 15.

In addition, the optical disc recording/reproducing apparatus 1 includes a chuck unit 2 for chucking an optical disc 100, a spindle motor 3 for rotationally driving the chuck unit 2, an optical pickup 4 for radiating the laser light to a signal recording surface of an optical disc 100 chucked by the chuck unit 2, an objective lens 5 for converging the laser light towards the signal recording surface of the optical disc 100 chucked by the chuck unit 2, a lens actuator 6 for causing movement of the objective lens 5 in the focussing direction, the aforementioned shock sensor 7 loaded on the optical pickup 4, the aforementioned shock level comparator 8 for comparing the value from the shock sensor 7 to a predetermined value, the aforementioned holding circuit 9 for holding the value of the shock level comparator 8 for a predetermined time interval, and the aforementioned first and second servo calculation units 10, 11 for performing servo calculations based on focussing error signals $S_A$ and the tracking error signals $S_B$ obtained by the optical pickup 4. The optical disc recording/reproducing apparatus 1 also includes a switch 12 changed over based on the results of comparison from the shock level comparator 8 outputted by the holding circuit 9 and a driver circuit 13 for performing servo control operations based on output values of the first and second servo calculation units 10, 11 supplied via switch 12.

The above-described optical disc recording/reproducing apparatus 1 runs the optical disc 10, fixed by the chuck unit 2, in rotation by the spindle motor 3.

The optical pickup 4 radiates the laser light to the signal recording surface of the rotating optical disc 100 from a laser light source, not shown. The objective lens 5 causes the laser light radiated from the laser light source to be focussed on the signal recording surface of the optical disc 100. The laser power of the laser light radiated from the optical pickup 4 during recording differs from that during reproduction.

The lens actuator 6 drives the objective lens 5. The lens actuator 6 is controlled by the driver circuit 13 and drives the objective lens 5 to execute tracking servo and focussing servo.

The first and second servo calculation units 10, 11 perform servo calculations based on the focussing error signals and the tracking error signals from the optical pickup 4.

The first and second servo calculation units 10, 11 are both constructed for filtering error signals to accord predetermined gain, and are provided with different filters and gain values.

Figure 2:
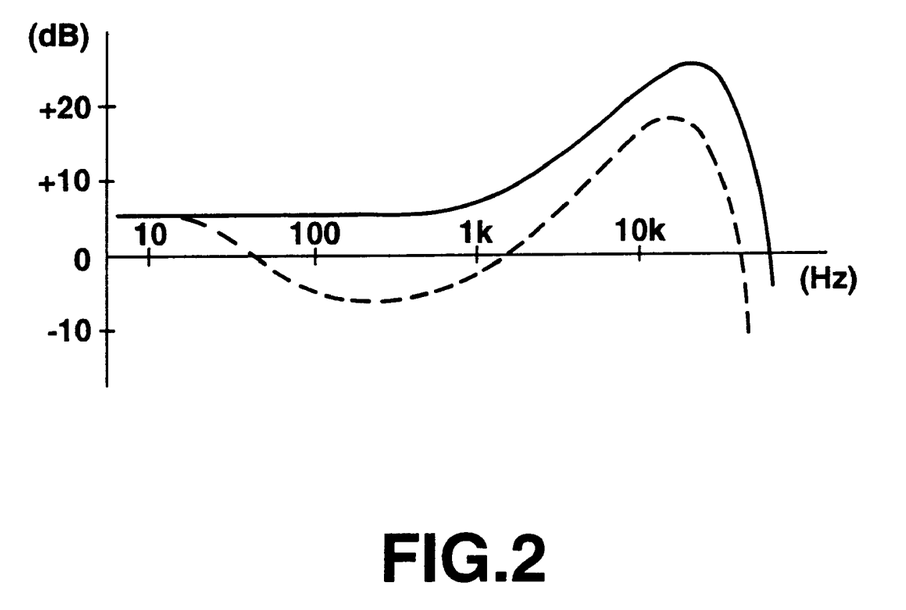
FIG. 2 is a graph showing the frequency response of two servo calculation units provided in the optical disc recording/reproducing apparatus.

FIG. 2 shows frequency response of the first and second servo calculation units 10, 11. In this figure, a broken line and a solid line indicate the frequency response of the first servo calculation unit 10 for outputting a signal enabling a usual followup performance and that of the second servo calculation unit 11 for outputting a signal enabling an improved followup performance, respectively.

The first servo calculation unit 10 constitutes a low-range gain uplifting filter from approximately 100 Hz to approximately tens of Hz for the purpose of increasing the gain of tens of Hz of the period of a rotational movement. By constituting the supporting stage 10 in this manner, it is possible to realize servo approximately capable of following up with the signal recording surface of the optical disc on occurrence of disturbance in the period of rotational movement of the usual optical disc.

The first servo calculation unit 10 also constitutes a high-range uplifting filter for phase lead compensation in a range from hundreds of Hz to approximately 10 kHz. This secures a servo band up to approximately a few kHz.

On the other hand, the second servo calculation unit 11 shifts the frequency band of the phase lead compensation high range uplifting filter towards the higher frequency side to provide a high gain in the high frequency range to constitute a filter. By constituting the second servo calculation unit 11 in this manner, servo followup characteristics can be achieved up to a band transiently higher than with the first servo calculation unit 10.

The focussing servo and the tracking servo are both schematically of the above-described frequency characteristics. In the embodiment of FIG. 2, the second servo calculation unit 11 is constituted as a filter flatter in the lower range in order to assure sufficient phase allowance in the high frequency range. However, similarly to the aforementioned first servo calculation unit 10, the second servo calculation unit 11 can also be constructed as a low range uplifting filter.

An output of the first servo calculation unit 10 or an output of the second servo calculation unit 11 is selected by a changeover operation of the switch 12 so that the selected output is sent to the driver circuit 13. The switch 12 is changed over by the controller 15 responsive to the impact strength as detected by the shock sensor 7.

The shock sensor 7 is loaded on the optical pickup 4 and is designed to detect the shock applied to the optical pickup 4. This shock sensor 7 outputs a signal proportionate to the applied shock. For example, the shock sensor 7 is responsive to the impact strength to output a signal $S_D$ shown in FIG. 3A. The output signal from the shock sensor 7 is entered to the shock level comparator 8 of the controller 15.

Figure 3A:
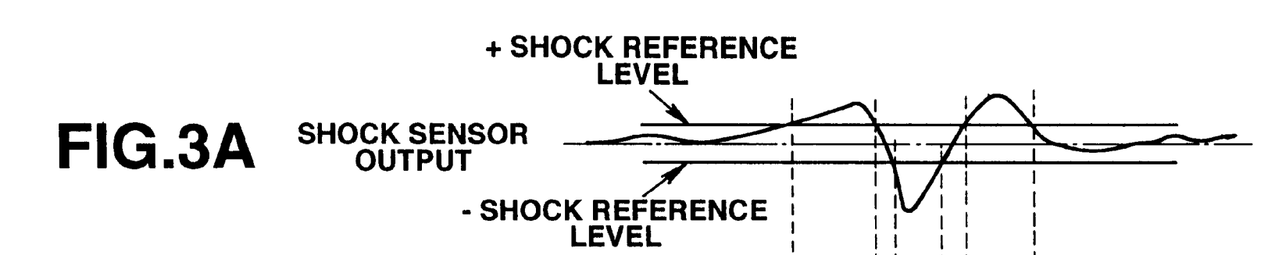
FIG. 3, consisting of FIGS. 3A through 3E, is a graph showing signal characteristics obtained with the optical disc recording/reproducing apparatus.

The shock level comparator 8 compares a pre-set value to the signal outputted by the shock sensor 7. The pre-set value in the shock level comparator 8 is a Preference value as indicated in FIG. 3A. For example, the reference level is a predicted level beyond which servo followup is not possible within a range of assuring recording or reproduction.

Figure 3B:
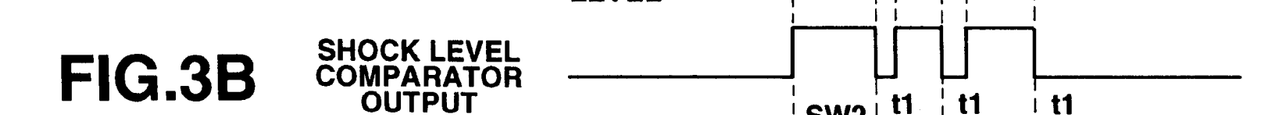

The shock level comparator 8 outputs the result of comparison between the output signal $S_D$ of the shock sensor 7 and the pre-set ±reference level. These results are outputted as pulse waveforms as indicated in FIG. 3B.

The holding circuit 9 holds the results of comparison outputted by the shock level comparator 8 for a pre-set time period. For example, the holding circuit 9 holds the results of comparison outputted by the shock level comparator 8 for a time interval of the minute, as shown in FIG. 3B.

Figure 3C:
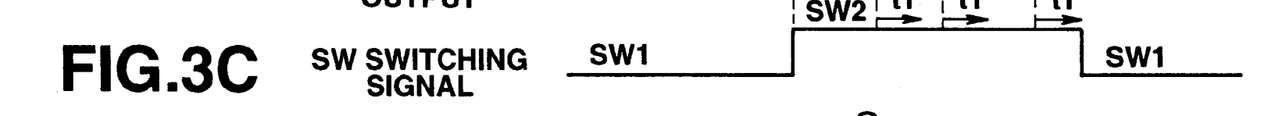

This takes into account the fact that the impact from outside is usually vibratory so that a train of pulses is outputted from the shock level comparator 8 as long as the vibration lasts. The results of comparison outputted by the shock level comparator 8 are held for a certain time duration by the holding circuit 9, so that, as shown in FIG. 3C, the results of comparison are outputted which are held on end for a time duration until the effect of the impact is alleviated, or an estimated time duration until the effect of the impact is alleviated.

The switch 12 changes over the servo information outputted by the first servo calculation unit 10 or by the second servo calculation unit 11, based on the changeover signal SE from the holding circuit 9, in order to output the selected signal to the downstream side driver circuit 13.

The driver circuit 13 drives the lens actuator 6 by the servo signal selected and outputted by the switch 12 to perform a servo followup operation.

Specifically, if the changeover signal is a rising signal, that is if the impact strength applied to the optical pickup 4 exceeds the aforementioned reference level, the switch 12 outputs the input servo signal from the second servo calculation unit 11 to the downstream side driver circuit 13. On the other hand, if the changeover signal is the falling signal, that is if the impact strength applied to the optical pickup 4 is smaller than the aforementioned reference level, the input servo signal from the first servo calculation unit 10 is outputted to the downstream side driver circuit 13.

Figure 3D:
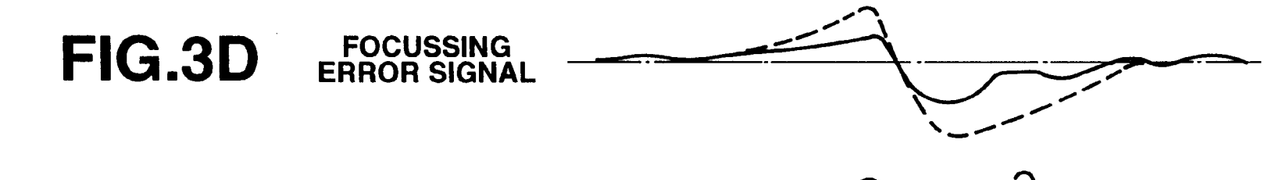
Figure 3E:
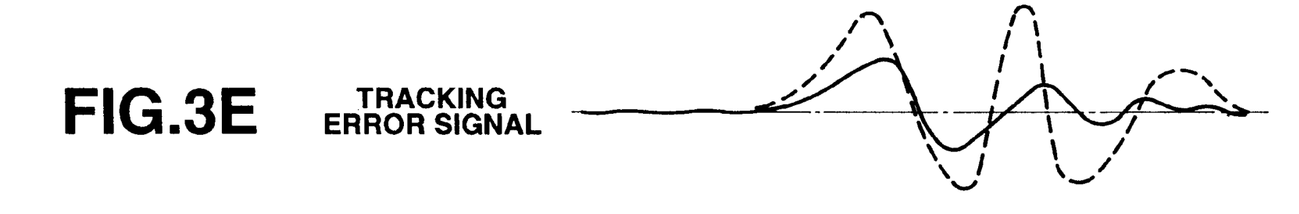

Thus, if the impact strength applied to the optical pickup 4 exceeds the aforementioned reference level, the driver circuit 13 can perform the servo operation with a high follow-up performance on the basis of the input servo signals from the second servo calculation unit 11. Since the servo with high followup performance can be applied on shock application, the focussing error signals and the tracking error signals can be reduced in magnitudes as indicated by broken lines in FIGS. 3D and 3E.

On the other hand, if the impact strength applied to the optical pickup 4 is smaller than the aforementioned reference level, the driver circuit 13 performs a servo operation by the usual followup performance based on the input servo signal from the first servo calculation unit 10.

With the above-described optical disc recording/reproducing apparatus 1, the servo operation is switched depending on the strength of the applied shock, such that the servo operation with high followup performance or the servo operation with the usual followup performance will be performed for the impact strength exceeding the reference level or the impact not strength exceeding the reference level, respectively. Thus it is possible to apply servo with improved followup performance capable of suppressing error occurrences without impairing steady-state stability.

Figure 4:
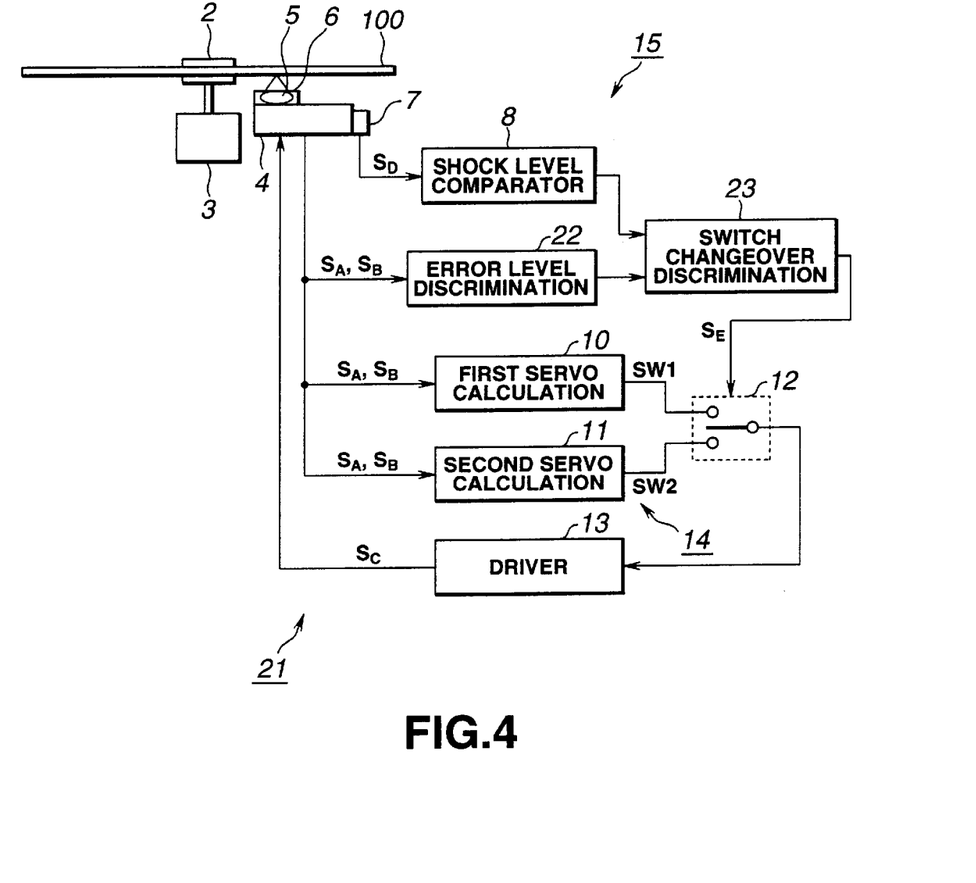
FIG. 4 is a block diagram showing the structure of the optical disc recording/reproducing apparatus and especially showing its modified structure.

The optical disc recording/reproducing apparatus 21, shown in FIG. 4, is constructed in basically the same manner as the above-described optical disc recording/reproducing apparatus 1 shown in FIG. 1. However, the apparatus shown in FIG. 4 differs from that shown in FIG. 2 in being provided with an error level discrimination unit 22 and with a switch changeover discrimination unit 23. For example, the error level discrimination unit 22 and the switch changeover discrimination unit 23 are those portions constituted in the controller 15.

Figures 5A, 5B:
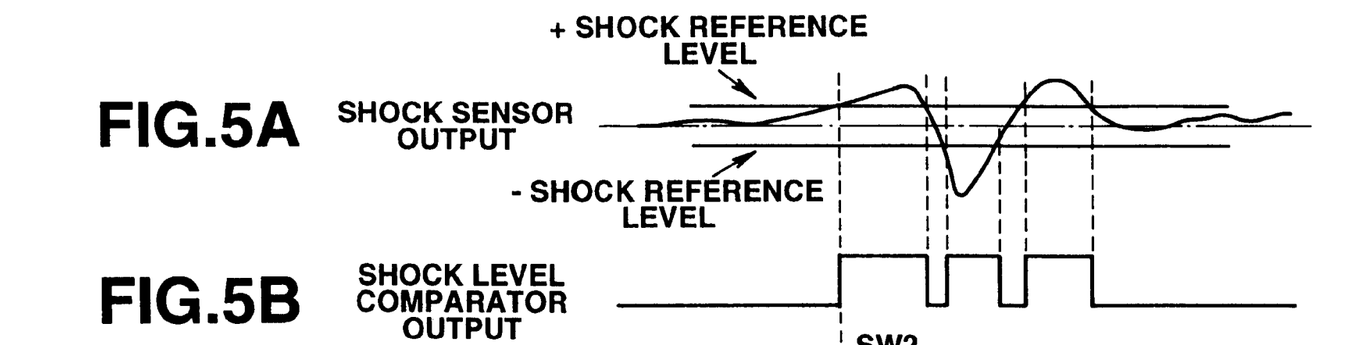
FIG. 5, consisting of FIGS. 5A through 5E, is a graph showing signal characteristics of the optical disc recording/reproducing apparatus having the modified structure.
Figure 5C:
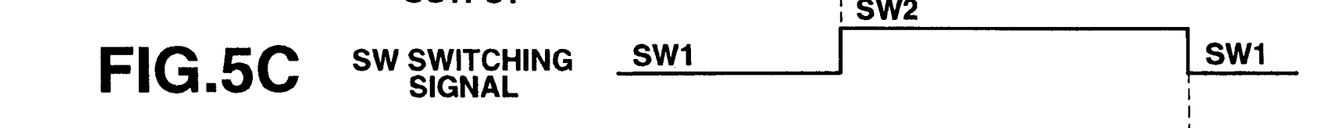
Figure 5D:
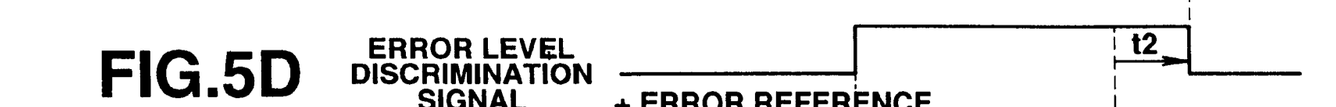
Figure 5E:
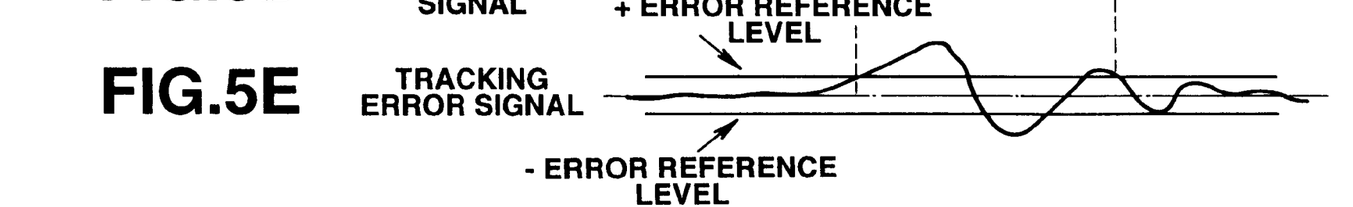

The error level discrimination unit 22 decides whether the focussing error signals $S_A$ or the tracking error signals $S_B$ do not exceed a pre-set value. Taking an example of the tracking error signals $S_B$, the error level discrimination unit 22 checks whether or not the ±error reference level is exceeded. If the error level is exceeded, an error level discrimination signal is raised, as shown in FIG. 5D.

On the other hand, the error level discrimination unit 22 detects that the error level has again subsided to a level within the reference level for a time duration t2 to lower the discrimination signal level.

As in the optical disc recording/reproducing apparatus 1 of FIG. 1, a signal corresponding to the impact strength, outputted by the shock sensor 7, is entered t the shock level comparator 8 of the optical disc recording/reproducing apparatus 21.

The switch changeover discrimination unit 23 is fed with a signal from the error level discrimination unit 22 and the results of comparison from the shock level comparator 8. This switch changeover discrimination unit 23 raises the switch changeover signal by the uplifting output signal of the shock level comparator 8, while lowering the switch changeover signal by the lowering of the decision signal from the error level discrimination unit 22 specifying the alleviation of the shock effect.

It is possible in this manner with the optical disc recording/reproducing apparatus 21 to switch to the second servo calculation unit 11 with the high followup performance, as long as the effect of the shock lasts, in order to suppress the effect of impact.

The shock level comparator 8, error level discrimination unit 22 and the switch changeover discrimination unit 23 in the optical disc recording/reproducing apparatus 1 or in the optical disc recording/reproducing apparatus 21, shown as embodiments of the present invention, can be constructed individually as corresponding circuits. Alternatively, these components can be replaced by a sole digital signal processor (DSP) having the respective functions.

The first servo calculation unit 10 and the second servo calculation unit 11 are each designed to perform both focussing servo and tracking servo. Alternatively, the first and second servo calculation units 10, 11 may be constructed to perform the two servo operations separately from each other.

Figure 6:
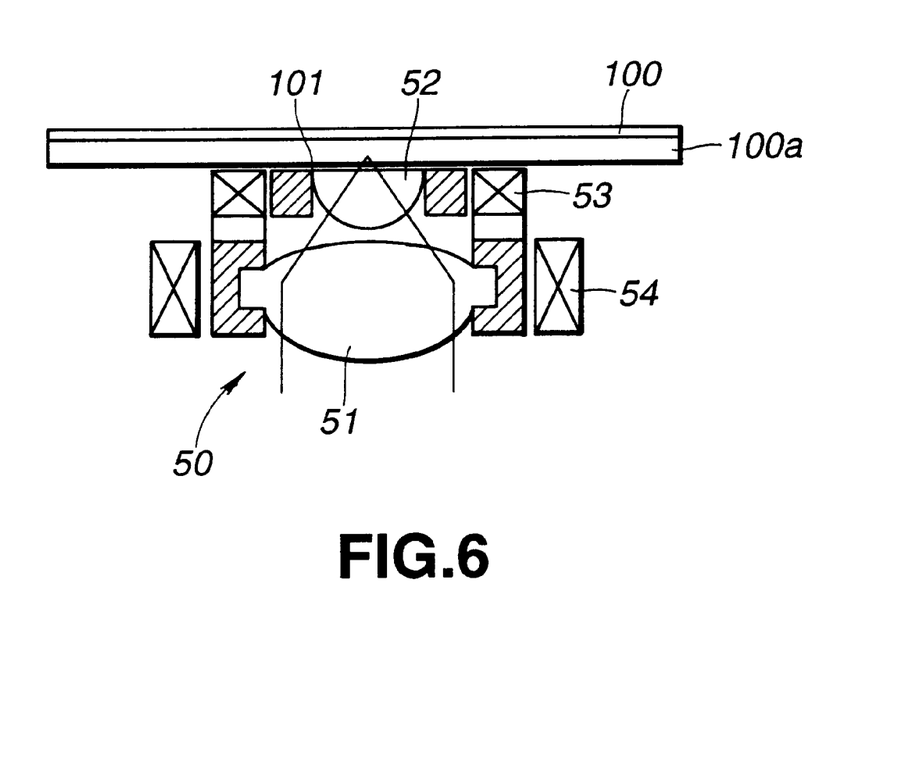
FIG. 6 is a cross-sectional view showing the structure of a two-set lens used for an objective lens provided in the optical disc recording/reproducing apparatus.

An objective lens, provided in the optical disc recording/ reproducing apparatus 1 or in the optical disc recording/ reproducing apparatus 21, may be constructed as a so-called double lens system, adapted to realize a high numerical aperture, shown in FIG. 6.

This double-lens type lens unit 50 has a forward lens 52 and an objective lens 51, which is a non-spherical lens. The forward lens 52 may be a semi-spherical lens made up of a flat surface and a spherical surface.

With the double-lens type lens unit 50, the forward lens 52 can be driven by an actuator 53 such that the double-lens type lens unit 50 in its entirety can be driven by an actuator 54.

The actuator 53 is configured for causing movement of the forward lens 52 relative to the objective lens 51 in the direction along the optical axis (in the up-and-down direction in the drawing). The actuator 54 is also configured for causing movement of the forward lens 52 and the objective lens 51 (in the focussing direction) while causing movement of the forward lens 52 and the objective lens 51 in a direction perpendicular to the track of the optical disc 100. By supplying the focussing error signals and the tracking error signals to this actuator 54, the distance of the double-lens type lens unit 50 from the optical disc 100 can be adjusted, while the light beam can be moved at right angles to the track.

With the above-described configuration, it is possible to adjust the distance between the objective lens 51 and the optical disc 100 by the actuator 54, while it is also possible to adjust the distance between the forward lens 52 and the objective lens 51 by the actuator 53.

The distance between these two lenses in the double-lens type lens unit 50 and that between the objective lens 51 and the optical disc 100 can be adjusted depending on the thickness of a disc substrate 100a of the optical disc 100 to suppress the spherical aberration.

With the above-described double-lens type lens unit 50, a high numerical aperture not less than 0.7, for example, equal to 0.81, is realized using a light source of the light having the wavelength not less than 680 nm. The working distance between the objective lens 51 and the optical disc 100 is not larger than 580 μum, for example, 100 μm. Thus, with the double-lens type lens unit 50, an air gap 101 is small with high NA, with the aberration being diminished.

Figure 7:
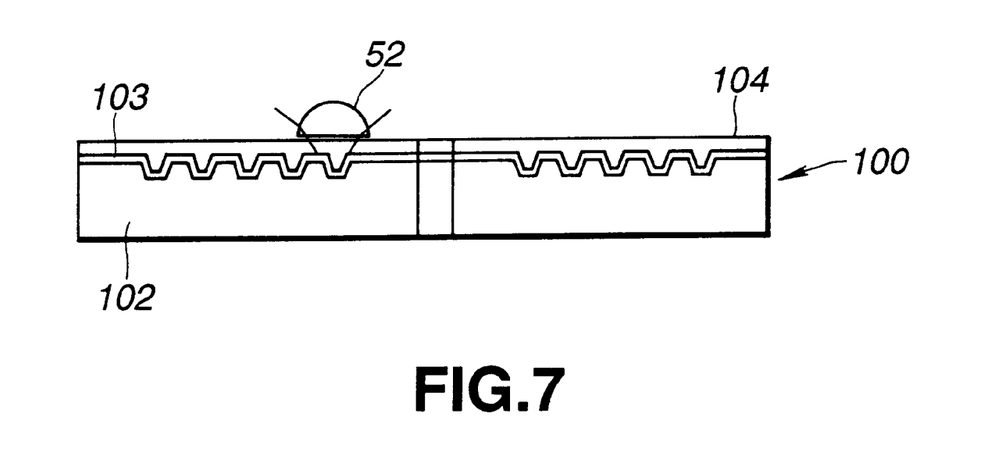
FIG. 7 illustrates the structure of an optical disc for which information signals are recorded or reproduced by the optical disc recording/reproducing apparatus having the modified structure.

An optical disc shown for example, in FIG. 7, may be used as the optical disc 100.

In producing the optical disc 100, a replica substrate 102 is fabricated by an injection molding method, using a stamper which realizes the pitch and pitch variations. On a signal surface of the replica substrate 102 is formed a recording film or a reflective film 103. If the optical disc 100 is a ROM, a reflective film, such as Al film, is formed thereon.

On the reflective film 103 is formed a cover layer 104. To this end, a UV curable resin (UV resin) is formed by drip rotation and stretching, on the film layer of the substrate prepared as described above. Alternatively, apolycarbonate sheet can be formed by bonding with a UV resin.

The light transmitting layer of the optical disc 100, fabricated as described above, may, for example, be 3 to 177 μm.

What is claimed is:

1. An optical disc recording and/or reproducing apparatus for performing a servo control operation based on focussing error signals and tracking error signals from an optical pickup, comprising:

impact detection means for detecting an impact applied from outside;

servo means for performing a servo control operation based on said focussing error signals and tracking error signals, said servo control operation being such an operation that is switched between a first state having a usual servo followup performance and a second state higher in a servo followup performance higher than said first state; and control means for checking the strength of an impact detected by said impact detection means for switching the servo control operation of said servo means to said second state when the strength of the impact exceeds a pre-set value.

2. The optical disc recording and/or reproducing apparatus according to claim 1 wherein said servo means includes first and second servo calculation means having respective different servo filters and gains in association with said first and second states of said servo control operation, respectively, and wherein switching is made between said first and second servo calculation means responsive to a changeover control signal from said control means.

3. The optical disc recording and/or reproducing apparatus according to claim 1 wherein said control means includes impact strength discrimination means for discriminating the impact strength detected by said impact detection means, holding means for holding the results of discrimination obtained by said impact strength detection means for a pre-set time duration, and switching means for switching between said first and second servo calculation means responsive to an output of said holding means.

4. The optical disc recording and/or reproducing apparatus according to claim 1 wherein said control means includes impact strength discrimination means for discriminating the impact strength detected by said impact detection means, error level discriminating means for discriminating the error signal level of said focussing error signals and the tracking error signals, and switching means for switching between the first and second servo calculation means responsive to an output of said error level discriminating means.

5. An optical disc recording and/or reproducing method, said method comprising:

detecting an impact applied external to an optical disc recording and/or reproducing apparatus;

performing a servo control operation based on said focussing error signals and tracking error signals, said servo control operation being such an operation that is switched between a first state having a usual servo followup performance and a second state higher in a servo followup performance higher than said first state; and checking the strength of an impact detected by said impact detection means for switching the servo control operation of said servo means to said second state when the strength of the impact exceeds a pre-set value.

* * * * *